B. P. REMY, F. I. REMY, F. P. McDERMOTT, Jr. & I. J. REUTER.
ELECTRIC GENERATOR.
APPLICATION FILED JAN. 16, 1911.
1,024,225.
Patented Apr. 23, 1912.
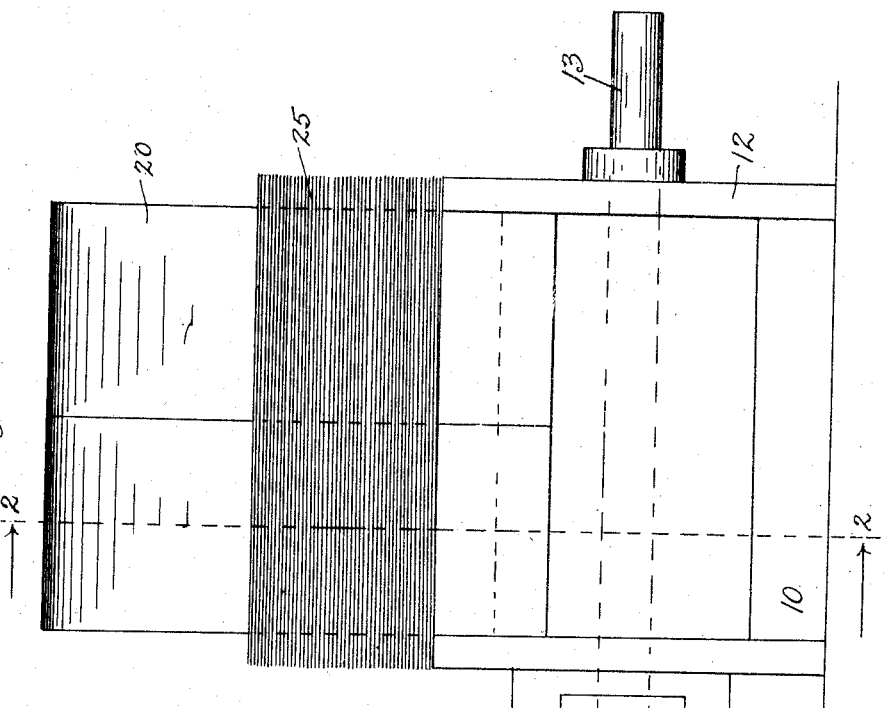
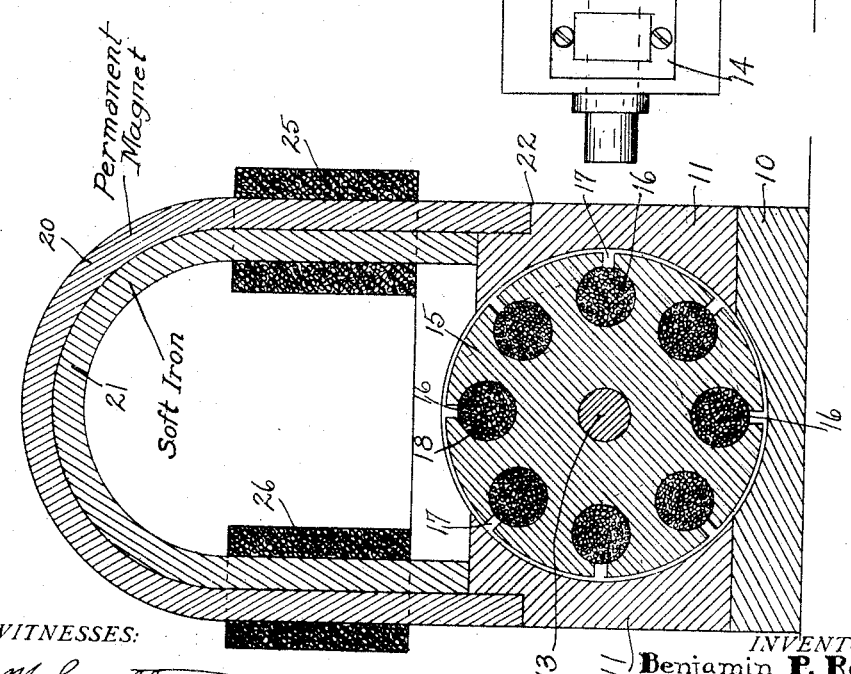
WITNESSES:
W. M. Gentle
O. M. McLaughlin
INVENTORS.
Benjamin P. Remy
Frank I. Remy
Franklin P. McDermott, Jr.
and Irving J. Reuter.
BY H. Lockwood
ATTORNEY.

UNITED STATES PATENT OFFICE.

BENJAMIN P. REMY, FRANK I. REMY, FRANKLIN P. McDERMOTT, JR., AND IRVING J. REUTER, OF ANDERSON, INDIANA, ASSIGNORS TO REMY ELECTRIC COMPANY, OF ANDERSON, INDIANA, A CORPORATION.

ELECTRIC GENERATOR.

1,024,225.  Specification of Letters Patent.  Patented Apr. 23, 1912.

Application filed January 16, 1911. Serial No. 602,997.

*To all whom it may concern:*

Be it known that we, BENJAMIN P. REMY, FRANK I. REMY, FRANKLIN P. McDERMOTT, Jr., and IRVING J. REUTER, citizens of the United States, and residents of Anderson, county of Madison, and State of Indiana, have invented a certain useful Electric Generator; and we do hereby declare that the following is a full, clear, and exact description thereof, reference being had to the accompanying drawings.

The object of this invention is to produce an electric generator adapted particularly for use on automobiles, although it may be employed for other purposes. It is adapted to be driven at a speed varying with that of the engine of the automobile, and to provide current for igniting the internal combustion engine of the automobile, lighting the automobile, operating the signaling horn thereof, etc.

For the uses mentioned above an electric generator should, first, be capable of having its output regulated to suit the load or work throughout such variations of speed and load as take place during the running of the automobile. The term "regulated to suit the load" will be understood by those skilled in the art, although its definition may depend upon the arrangement of the elements constituting the load. If, for example, these elements are connected in parallel, the regulation consists in maintaining a constant electromotive force between the conductors with which said load is connected. In the second place, it should be possible to start the internal combustion engine by cranking with no other source of current than that provided by the electric generator, and to that end the output of such generator should be capable of operating ignition apparatus, even when the generator is turned by a fraction of a revolution and at a speed below the speeds occurring during the usual operation of the engine. Therefore, neither a dynamo nor a magneto suffices to accomplish the result desired. A dynamo is well adapted as a source of current for automobiles, etc., after the engine is in operation, but it is not satisfactory for starting the engine. The magnetic flux is small when the dynamo is not in operation, but when it is running, a portion of the energy generated is utilized in the field windings to increase the flux and cause the machine to build up or deliver more power than could be obtained if the residual flux alone were present. Below a certain critical speed, however, the dynamo would not build up, and, also, owing to the self-induction of its windings, a certain time is required for building up even when the dynamo is running at a speed above the critical speed. On the other hand, a magneto has a strong magnetic field, even when standing still, and, therefore, it can give a larger output than a dynamo when turned at extremely slow speeds, and, furthermore, the magneto does not require time to build up its field before delivering its output. Hence, the magneto is well adapted as a source of current for starting the engine, but its output cannot be as readily controlled thereafter as the output of the dynamo for adapting it to perform other functions.

This invention in electric generators, in a sense, combines the magneto and the dynamo in order to attain the ease of regulation of the dynamo with the engine starting qualities of the magneto.

The nature of the invention will be understood from the accompanying drawings and the following description and claims.

In the drawings, Figure 1 is a side elevation of the electric generator. Fig. 2 is a transverse section on the line 2—2 of Fig. 1.

In the drawings there is shown in detail a base 10, pole pieces 11, end plates 12, an armature or inductor shaft 13 mounted in said end plates and a brush holder 14. These parts may be of any usual type, as they constitute by themselves no essential part of our invention.

The armature consists of the core 15 secured on the shaft 13 and is provided with a series of holes 16 extending longitudinally through the same, and longitudinal slots 17 extending from the holes to the periphery so that there is provided a number of T-shaped portions about which the armature coils 18 are wound. The particular manner of forming this armature is likewise not essential to this invention, although for the particular form of regulation herein described, it must generate direct current.

There are two sorts of magnets, permanent magnets 20 and soft iron magnets 21, the latter being within the former, but they may be otherwise arranged. The soft iron magnets are of such a character that the flux through them may be readily varied in amount, and, if desired, in direction, by means of current in the hereinafter described field winding. The permanent magnets should produce a large amount of flux when there is no current in the field winding, and in order to obtain this result with certainty, it is necessary to use magnets whose flux is relatively little altered by the current in the field winding. The soft iron magnets rest upon the pole pieces, but not necessarily so. The permanent magnets are set in longitudinal notches 22 at the upper lateral edges of the pole pieces, but this detail is immaterial. Field coils 25 and 26 surround both sorts of magnets preferably, although it is not absolutely necessary that they surround more than the soft iron magnets, or that there be a plurality of coils 25 and 26. However, the construction described and shown is considered preferable. It is desirable, however, that the two sorts of magnets be arranged with reference to the armature so that they will influence each other's magnetic flux. The field winding is adapted to produce a magneto-motive force in either direction, according to the requirements of the load. It is designated as "magnetizing" when it acts with the permanent magnets, that is, increases the flux passing through the armature core, and "demagnetizing" when it decreases this flux.

The coil 25 may be considered the magnetizing coil, and the coil 26 the demagnetizing coil.

From the foregoing description it will be seen that when the generator is at a standstill, a large portion of the flux supplied by the permanent magnets passes through the armature core, so that an electromotive force will be generated when the machine is operated at a very slow speed, as would be the case with a magneto.

The interaction of the flux from the two sorts of magnets exists regardless of how they are situated with relation to each other so long as there is a single armature. The electromotive force generated by the armature depends on the flux produced by each of the magnets. Hence, the invention is not limited necessarily to the relative position of the two sorts of magnets, as shown in the drawings. Nor is it necessary that the field windings surround the physical magnets, for it will suffice if they surround some other portion of the magnetic circuits including said magnet or magnets and the armature. Hence, the invention is not necessarily limited to a device in which the field coil surrounds a magnet, so long as it surrounds the magnetic circuit formed by said magnet. The invention applies to a generator having either a direct current or an alternating current armature, and also wherein the flux from the permanent and soft magnets have different paths through the armature rather than substantially the same paths as in the form shown in the drawings. Nor is the invention necessarily limited to the method of regulation herein set forth, as other means of regulation well known might be employed.

A dynamo, especially if designed to produce low electromotive force, frequently fails to build up on account of the drop of electromotive force between the commutator and the brushes. This drop is caused by contact resistance, vibration of the brushes, dirt, etc. The electromotive force generated when only the residual magnetic flux is present may be insufficient to overcome this drop and the field magnets receive little or no current. By increasing the amount of flux which is present in the armature core before the machine builds up, the liability of the brush contact resistance to prevent building up is minimized. This is obtained by the use of the permanent magnets in our generator, and at the same time the advantage of the dynamo as regards the ease of regulation is obtained.

When a generator is in operation the flux obtained from permanent magnets is smaller for a given cross section than that which may be obtained from electromagnets, so that a dynamo is better than a magneto in regard to the output obtainable from a given amount of iron in the field magnet. This advantage of the dynamo is also largely present in our invention.

It will be observed that the magnetic flux supplied by the permanent magnet is not required to pass through the soft iron magnet and the magnetic flux supplied by the soft iron magnet is not required to pass through the permanent magnet, although the flux from the two magnets have a more or less common path through the armature and pole pieces. With this construction, it is not necessary that the magnetic flux through the permanent magnet be varied in order to produce regulation. This makes it possible to reduce the E. M. F. generated by the armature without demagnetizing the permanent magnet. It, therefore, makes it possible to regulate by the use of fewer ampere turns in the winding than would be necessary if the magnetism of the permanent magnet had to be varied through a wide range as would be the case if all of the magnetic flux would be required to pass through the permanent magnet. Preferably the magnetic circuits of the armature and the soft iron magnet and the permanent magnet are in parallel.

We claim as our invention:

1. An electric generator provided with a permanent field magnet and a soft iron field magnet parallel with the permanent magnet, an armature between both ends of both sorts of magnets, and a field coil surrounding the magnetic circuit of the soft iron field magnet.

2. An electric generator provided with a permanent field magnet, a soft iron field magnet parallel with the permanent magnet, an armature between both ends of both sorts of magnets, and a field coil surrounding the magnetic circuits of both the soft iron and permanent field magnets.

3. An electric generator provided with a permanent field magnet, a soft iron field magnet located within said permanent field magnet, an armature between both ends of both sorts of magnets, and a field coil surrounding both sorts of magnets.

4. An electric generator provided with a horseshoe permanent field magnet, a horseshoe soft iron field magnet located within the permanent magnet, a pair of oppositely located pole pieces each pole piece in contact with the adjacent ends of both sorts of magnets, an armature between said pole pieces, and a field coil surrounding said magnets.

In witness whereof, we have hereunto affixed our signatures in the presence of the witnesses herein named.

BENJAMIN P. REMY.
FRANK I. REMY.
FRANKLIN P. McDERMOTT, Jr.
IRVING J. REUTER.

Witnesses:
B. M. REMY,
MARGARET W. REMY.

Copies of this patent may be obtained for five cents each, by addressing the "Commissioner of Patents, Washington, D. C."